US008671146B2

(12) United States Patent
Dilillo et al.

(10) Patent No.: US 8,671,146 B2
(45) Date of Patent: Mar. 11, 2014

(54) PRESENCE AWARE NOTIFICATION FOR INFORMATION TECHNOLOGY MANAGEMENT (75) Inventors: Gerardo Dilillo, Sammamish, WA (US); Lorenzo Rizzi, Kirkland, WA (US); Arun D. Raghavan, Seattle, WA (US); Adam Herscher, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1566 days.

(21) Appl. No.: 11/680,417

(22) Filed: Feb. 28, 2007

(65) Prior Publication Data

US 2008/0209280 A1   Aug. 28, 2008

(51) Int. Cl.
*G06F 15/16* (2006.01)

(52) U.S. Cl.
USPC ........... 709/206; 709/224; 709/226; 709/230; 709/202; 455/405; 455/414; 370/230; 370/236

(58) Field of Classification Search
USPC .......... 709/206, 224, 226, 230, 202; 455/405, 455/414; 370/230, 236
See application file for complete search history.

(56) References Cited

U.S. PATENT DOCUMENTS

| 6,446,058 | B1 | 9/2002 | Brown |
| 6,556,659 | B1 | 4/2003 | Bowman-Amuah |
| 6,654,801 | B2 | 11/2003 | Mann et al. |
| 6,763,093 | B2* | 7/2004 | Lumsden .................... 379/88.22 |
| 7,130,902 | B2* | 10/2006 | Bradley et al. ................ 709/224 |
| 7,159,237 | B2 | 1/2007 | Schneier et al. |
| 7,567,797 | B1* | 7/2009 | Lee et al. .................... 455/414.1 |
| 2003/0229670 | A1* | 12/2003 | Beyda ............................ 709/206 |
| 2004/0093387 | A1* | 5/2004 | Wick ............................ 709/207 |
| 2004/0158629 | A1 | 8/2004 | Herbeck et al. |
| 2005/0010461 | A1 | 1/2005 | Manos |
| 2005/0091227 | A1* | 4/2005 | McCollum et al. ........... 707/100 |
| 2005/0187781 | A1 | 8/2005 | Christensen |
| 2006/0048162 | A1* | 3/2006 | Boult ............................ 719/310 |
| 2006/0210034 | A1* | 9/2006 | Beadle et al. .............. 379/88.22 |
| 2007/0038737 | A1* | 2/2007 | Keller et al. .................. 709/224 |
| 2007/0118608 | A1* | 5/2007 | Egli ............................. 709/217 |
| 2007/0226299 | A1* | 9/2007 | Shaffer et al. ................ 709/206 |
| 2008/0088428 | A1* | 4/2008 | Pitre et al. .................... 340/506 |
| 2008/0125079 | A1* | 5/2008 | O'Neil et al. ................. 455/405 |

FOREIGN PATENT DOCUMENTS

CN   1458785 A   11/2003
CN   1692400 A   11/2005

(Continued)

OTHER PUBLICATIONS

"IBM Infrastructure and System Management Services", available at least as early as Jan. 9, 2007, at<< http://www-935.ibm.com/services/us/its/pdf/g510-1451-03.pdf>>, IBM Corporation 2002, pp. 1-4.

(Continued)

*Primary Examiner* — Thuong Nguyen
(74) *Attorney, Agent, or Firm* — Jim Sfekas; Kate Drakos; Micky Minhas (57) ABSTRACT

Systems and methods for information technology (IT) management, utilizing presence aware notification, are disclosed. In an implementation, the method includes receiving availability or online status of one or more users at an IT management server. The IT management server queries a monitoring database for one or more alerts. The one or more alerts are sent to the one or more users based on respective availability or online status.

15 Claims, 6 Drawing Sheets

(56) References Cited

FOREIGN PATENT DOCUMENTS

| JP | 2001078272 | 3/2001 |
|----|------------|--------|
| JP | 2001197204 | 7/2001 |
| JP | 2005018194 | 1/2005 |
| JP | 2005129067 | 5/2005 |
| JP | 2005275815 | 10/2005 |
| JP | 2005318503 | 11/2005 |
| JP | 2006005453 | 1/2006 |

OTHER PUBLICATIONS

"PageAlert", Jan. 10, 2007, at <<http://h20229.www2.hp.com/partner/isv/Nobix_prod1.jsp>>, Hewlett-Packard developement Company, 2007 pp. 1-2.

"Service Management Functions Problem Management", Jan. 10, 2007, at<<http://www.microsoft.com/technet/solutionaccelerators/cits/mo/smf/smfprbmg.mspx>>, Microsoft Corporation, 2007 pp. 1-61.

The Japanese Office Action mailed Apr. 27, 2012 for Japanese patent application No. 2009-551831, a counterpart foreign application of U.S. Appl. No. 11/680,417, 5 pages.

The Chinese Office Action mailed Aug. 18, 2011 for Chinese Patent Application No. 200880006543.7, a counterpart foreign application of U.S. Appl. No. 11/680,417, 8 pages.

The Chinese Office Action mailed Nov. 24, 2011 for Chinese Patent Application No. 200880006543.7, a counterpart foreign application of U.S. Appl. No. 11/680,417, 11 pages.

* cited by examiner

PRESENCE AWARE NOTIFICATION FOR INFORMATION TECHNOLOGY MANAGEMENT

BACKGROUND

Reliability and efficiency of information technology (IT) infrastructures are heavily dependent on IT management and resolution time for IT related queries and/or alerts. In a typical IT infrastructure, network management systems can provide comprehensive event management, proactive monitoring, alerting, and notification functionalities. Notification can include sending an alert or query to an identified individual or a group of technical support staff at a help desk. At times, the alert or query may be left unattended due to absence or non availability of the individual or the group, resulting in inefficient or unsatisfactory IT management. A possible solution may be an escalation mechanism, in which, if there is no action from the technical support staff within a resolution time period, a notification is sent to another party, such as technical support team leader or manager. A downside of such an approach is that it may cause unwanted delay which may not be acceptable in time critical situations.

In an IT infrastructure, an important aspect associated with network management is notification of an alert to technical support staff (i.e., IT staff). Such an alert may be related to a problem with an operating system or any other software product marketed by a company. Furthermore, IT issues may also be caused by also by hardware failures (e.g., printer offline, network connection failure). Although systems and methods for network management may provide automatic alert notification capabilities, an alert may be left unattended if the technical support staff is offline or on leave. A team manager of the technical support staff may be notified about the unattended alert but this may cause delay in obtaining assistance for the alert. Such a delay causes increased response time and resolution time which maybe crucial in certain scenarios.

SUMMARY

This summary is provided to introduce simplified concepts of presence aware notification for information technology (IT) management, which is further described below in the Detailed Description. This summary is not intended to identify essential features of the claimed subject matter, nor is it intended for use in determining the scope of the claimed subject matter.

In an embodiment, available status of one or more users such as IT administrators is received. Alerts may be provided to the users, where alert notifications are sent out to users based on availability of the users.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

The following disclosure describes systems and methods for information technology management utilizing presence aware notification. While aspects of described systems and methods for IT management utilizing presence aware notification can be implemented in any number of different computing systems, environments, and/or configurations, embodiments of the systems and methods are described in the context of the following exemplary system architecture(s).

The disclosed systems and methods provide for a presence aware notification of users (members) of the technical support for improved IT management. One or more alerts may be directed to an associated technical support staff based on their availability status and location. In an implementation, an IT management server utilizes user information (e.g., availability status and location of a user) provided by a communication server for sending alert notifications and establishing a communication session with the users. Such an IT management system can ensure effective alert notification and optimizes the resolution and response time for an alert.

Exemplary System

Figure 1:
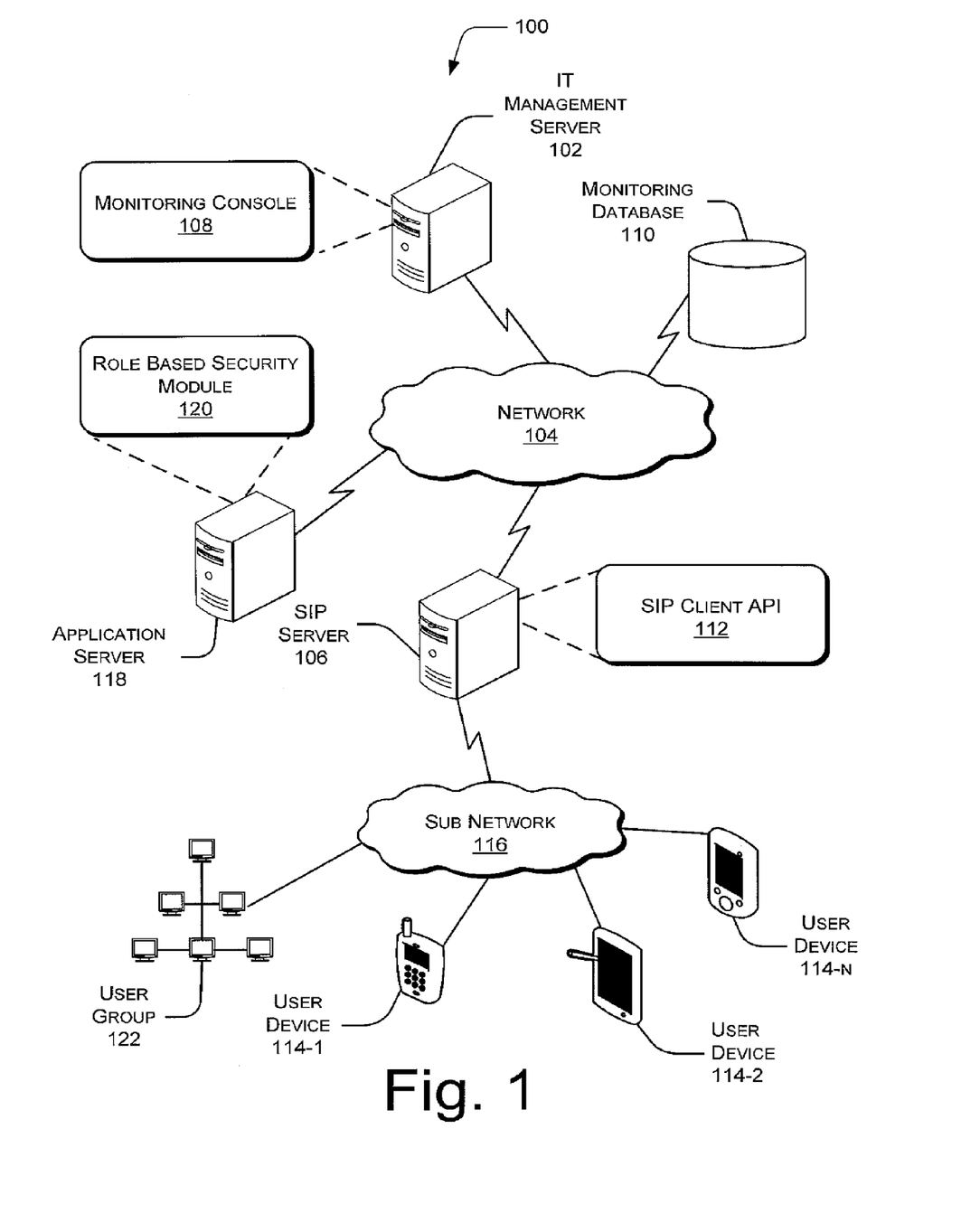
FIG. 1 is an illustration of an exemplary system implementing presence aware notification for information technology management.

FIG. 1 shows an exemplary system 100 for presence aware notification for information technology (IT) management. To this end, system 100 includes an IT management server 102 in communication, through a network 104, with a communication server, such as, a session initiation protocol (SIP) server 106. The system 100 may be a Terminal Service™ system as provided or defined by the Microsoft® Corporation, where the SIP server 106 may be invoked by application(s) being executed on the IT management server 102. Such applications may provide management functionality, and particularly include one or more network management modules that provide event management, proactive monitoring, alerting, and alert notification functionalities for management of IT infrastructures. Terminal Service™ and SIP are described as examples; however, it is contemplated that other systems and protocols may be implemented.

The IT management server 102 maybe includes one of various operating systems. The IT management server 102 may be implemented as any of a variety of conventional computing devices, including, such as a desktop PC, a notebook or portable computer, a workstation, a mainframe computer, a mobile computing device, an Internet appliance, etc. that may be configured to provide administrative or management capabilities to a network or IT administrator. Furthermore, the IT management server 102 may also include one or more of the aforementioned computing devices configured as a server in a server-client computing environment.

The SIP server 106 implements session initiation, protocol (SIP) which is an application-layer control (i.e., signaling) protocol for creating, modifying, and terminating communication sessions with one or more computing devices. Such a protocol (i.e., SIP) is used as an example and it is contemplated that other protocols may be used. These sessions include Internet telephone calls, multimedia distribution, and multimedia conferences, etc. The SIP server 106 may be a general-purpose PC (personal computer), a laptop PC, a tablet PC, or the like, and may implement an operating system such as a Windows® brand operating system from Microsoft® Corporation. The SIP server 106 may also be a communication server that provides call set up facilities between users, availability status of users, instant messaging, etc. Alternatively, the SIP server 106 may be implemented as a standalone communication server that primarily interfaces to the IT management server 102 to provide information required for IT management.

The network 104 may be a wireless or a wired network, or a combination thereof. The network 104 may also be a collection of individual networks, interconnected with each other and functioning as a single large network (e.g., the Internet or an intranet). Examples of such individual networks include, but are not limited to, local area networks (LANs), wide area networks (WANs), and metropolitan area networks (MANs). Further, the individual networks may be wireless or wired networks, or a combination thereof Moreover, the network 104 connecting the IT management server 102 and the SIP server 106 may implement one or more of application layer and transport layer protocols such as transmission control protocol over Internet protocol (TCP/IP), user datagram protocol (UDP), real-time transport protocol (RTP), domain name server (DNS), simple mail transfer protocol (SMTP), etc.

In an exemplary implementation, the IT management server 102 hosts a network management system which enables management of one or more networks. An example of such a network management system is Microsoft® System Center Operations manager or "Ops Mgr". The network management system includes a monitoring console 108 for implementing monitoring aspects of the network management system.

The IT management server 102 may be in communication with one or more network computing devices in a workgroup. By way of example, the work group may be a local area network (LAN), which includes one or more of computing devices in an organization that are managed by an IT administrator. Another example is a network of servers operating in an organization. An IT administrator may utilize a network management system (e.g., Ops Mgr) to facilitate comprehensive event management, proactive monitoring, alerting, and notification functionalities with regard to the computing devices that constitute the network or work group being managed. Accordingly, the computing devices in the network pr work group may be configured to report an error or an alert to the network management system.

A monitoring database 110 may store alert notifications received from one or more computing devices of a managed network (e.g., work group or LAN in an organization). The monitoring database 110 may be implemented as a computer-readable media in the form of volatile memory, such as random access memory (RAM) and/or non-volatile memory, such as read only memory (ROM) or flash RAM or a combination thereof. The network management system may configure the monitoring database 110 to store alert notifications received from the work group. Alternatively, the monitoring database 110 may be implemented in the IT management server 102.

The SIP server 106 may implement a SIP client application program interface (API) 112 to expose information associated with one or more users to which an alert may be directed to. The SIP client API 112 may be a live communication server API or a set of APIs that support functionalities specific to the type of SIP server 106 implemented in the system 100.

The SIP client API 112 may invoke the monitoring console 108 to query the monitoring database 110 for one or more alert notifications. Subsequently, the SIP client API 112 may populate the monitoring console 108 with information about users (i.e., user information) to which the one or more alerts may be directed to. Such users may be a part of a help desk or a service desk, where the users may be technical support or assistance staff employed by various service providers.

The users may be online by means of user devices 114-1, 114-2, and . . . , 114-N in communication with the SIP server 106 through a sub network 116. In an alternative embodiment, the user devices 114 may be one or more of a desktop PC, a notebook or portable computer, a workstation, a mainframe computer, a mobile computing device, a smart phone, an Internet appliance, personal digital assistant (PDA), etc.

Moreover, the sub network 116 may be a collection of individual networks, interconnected with each other and functioning as a single large network (e.g., the Internet or an intranet). Examples of such individual networks include, but are not limited to, LANs, WANs, and MANs. Further, the individual networks may be wireless or wired networks, or a combination thereof. The sub network 116 connecting the SIP server 106 and the user devices 114 may implement one or more of application layer and transport layer protocols such as transmission control protocol over Internet protocol (TCP/IP), user datagram protocol (UDP), real-time transport protocol (RTP), domain name server (DNS), simple mail transfer protocol (SMTP), etc.

In an exemplary configuration, the SIP server 106 supports presence aware notification indicative of an online status of a user at a given instant of time. Accordingly, the SIP client API 112 ascertains the availability of a user and populates such information at the monitoring console 108. The availability of a user (availability of a user being a user's present online or offline status) may be determined depending upon the connectivity status of the user or the presence or absence of the user. For example, if a user is in a mobile network and the user is connected through a mobile device (e.g., user device 114-1), the SIP client API 112 may infer that the user is online and available for attending to an alert. The SIP client API 112 sends such user information to the monitoring console 108.

The monitoring console 108 receives the information associated with the one or more users (i.e., user information) and may form groups of users in accordance with a role based security policy. For example, the role based security policy may be implemented in an application server 118 to define and implement roles of different users and their associated scope. In this example, the application server 118 includes a role based security module 120 which is configurable by an IT administrator/manager to define various roles and respective scopes. The roles and respective scopes may be referred to as role description. For example, a particular user may be assigned a role of a team leader and another user may be assigned a role of technical support.

The role based security module 120 may facilitate an IT administrator to implement a security policy for a network management system (e.g. Ops Mgr) based on the roles assigned, which can ensure security of data by allowing users (e.g. members of the technical support staff) to have access to relevant information only. For example, a user attending to an alert associated with a structured query language or SQL Server may have no access to an alert associated with Window® 2003 server. The role based security module 120 may send a role description (i.e., details of roles and associated scopes) of various users to the monitoring console 108. The monitoring console 108 may then store and utilize the received role description to form one or more groups.

The monitoring console 108 may also provide an interactive interface to an IT administrator or manager to better facilitate network management. An example of an interactive interface discussed below in reference to FIG. 4 and is described under the section titled "Exemplary Interactive Interface." The interactive interface can display data that includes user information (e.g., user name), group information (e.g., group name), alert details (e.g., alert type, time of occurrence, resolution status, etc.), and other relevant details associated with alert notification. The interface may also display availability status of one or more users as provided by the SIP client API 112.

Such an interactive interface exposes capabilities of the monitoring a group, etc. An alert may be forwarded to a user device 114 or a user group 122 as shown in FIG. 1. The user group 122 may be formed by the monitoring console 108 by utilizing the role description, or may be a predefined group formed by a technical support team manager or leader. Although a single user group 122 has been shown in FIG. 1, it is contemplated that any number of groups may be formed.

In an embodiment, the monitoring console 108 enables manual and automatic alert notification. In manual alert notification, an IT administrator may utilize the availability status as displayed on the interactive interface to send alert notification to a user device (e.g. user devices 114) or a user group 122. Alternatively, in an automatic alert notification, the monitoring console 108 simply sends an alert notification to a user or a user group based on availability status and location of prospective recipients. The IT administrator may select either one of the manual or the automatic alert notification modes for the purpose of an exemplary network management.

Exemplary IT Management Server

Figure 2:
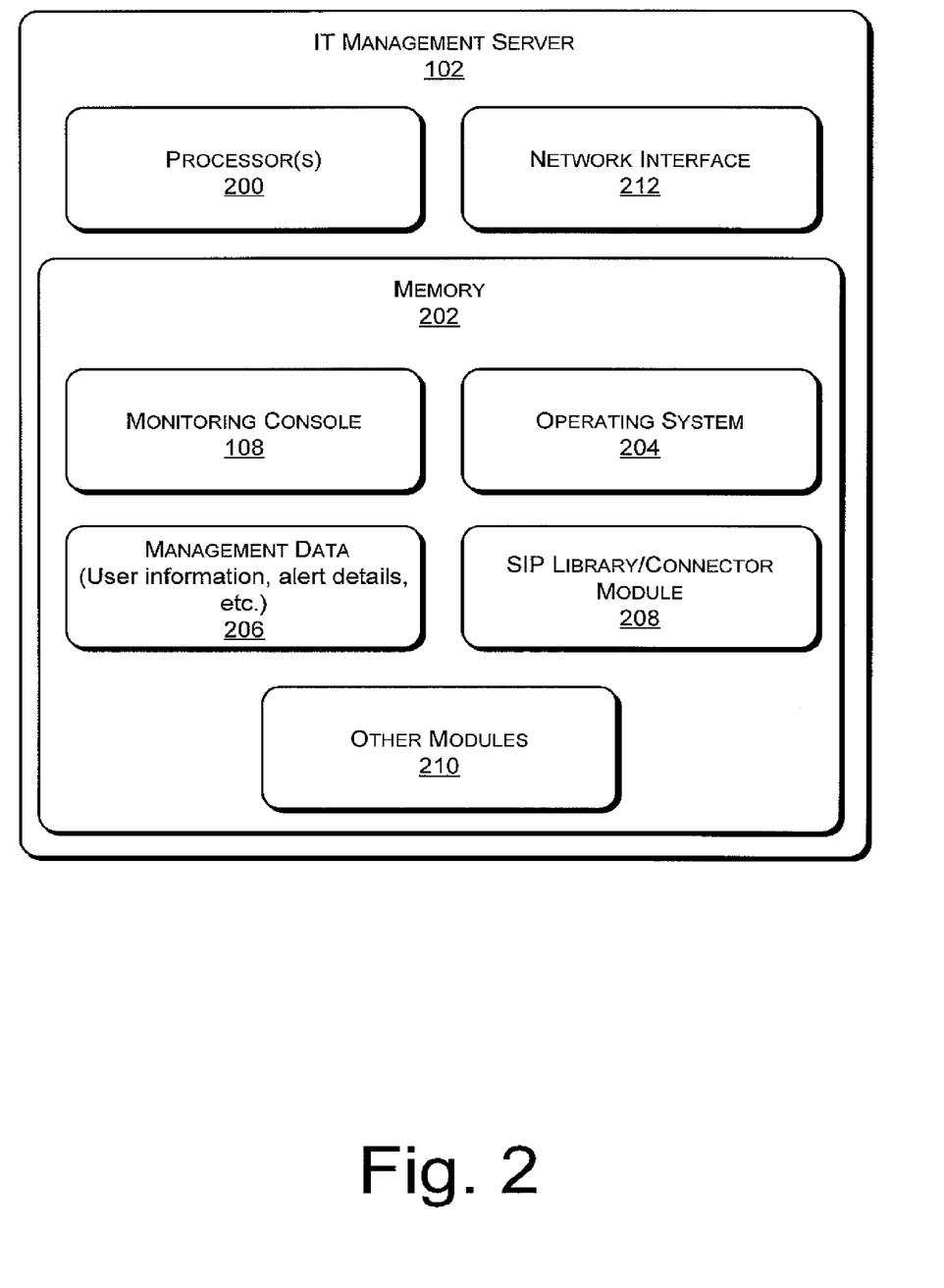
FIG. 2 is an illustration of an implementation of an exemplary information technology (IT) management server for managing an IT infrastructure using presence aware notification.

FIG. 2 shows an implementation of an IT management server 102 for managing an IT infrastructure using presence aware notification. The IT management server 102 can include one or more processors 200 coupled to a memory 202. Such processor(s) 200 could be for example, microprocessors, microcomputers, microcontrollers, digital signal processors, central processing units, state machines, logic circuitries, and/or any devices that manipulate data based on operational instructions. The processor(s) 200 are configured to fetch and execute computer-program instructions stored in the memory 202. Memory 202 includes computer-readable media in the form of volatile memory, such as Random Access Memory (RAM) and/or non-volatile memory, such as Read Only Memory (ROM) or flash RAM or a combination thereof.

The memory 202 can include an operating system 204 that provides a platform for execution of one or more applications on the IT management server 102. The memory 202 can farther include the monitoring console 108 to facilitate network management utilizing a presence aware notification. Accordingly, the monitoring console 108 queries a monitoring database 110 for alert notifications. In response to the query, the monitoring database 110 provides one or more alerts with associated alert details to the monitoring console 108. The monitoring console 108 stores the received alerts and alert details in management data 206.

A network management system (e.g., Ops Mgr) can deploy one or more agent(s) at one or more computing devices and or servers in a network (e.g. LAN or a work group being managed by the IT management server 102) to monitor the functioning of respective computing devices and or servers. The one or more agents can generate an error or a failure report which relates to a problem encountered during the execution of one or more applications on the respective computing device.

An agent reports an error or a failure as an alert notification to the network management system. An alert notification may include alert details, for example, version of the operating system associated with the computing device, time of occurrence, type of associated application, priority, severity, and nature of the problem, etc. In such an implementation, the monitoring database 110 receives alert notifications from one or more agents installed by the network management system. The received alert notification may be sent to the monitoring console 108, upon an invocation.

Subsequent to receiving the alert notifications, the monitoring console 108 may invoke the SIP client API 112 to populate user information associated with one or more users (e.g. user device 114) or user group(s) 122. The monitoring console 108 can receive and store the user information in the management data 206. The monitoring console 108 then utilizes the user information to ascertain the availability status of a user or users of a user group 122.

In an alternative embodiment, the monitoring console 108 displays the alert details and the user information in an interactive interface. The interface may indicate the availability status (i.e., online or offline) of a user by displaying a colored icon against the user (e.g., green icon for online or present status, red icon for offline or absent status). In a manual mode of network management, an IT administrator may utilize the interactive interface to direct an alert notification to user or a user group based on their availability status. Accordingly, the monitoring console 108 may send an alert notification to the user or a user group (e.g., user group 122) by way of an electronic mail (email), a short messaging service (SMS), or an instant message on the user device 114.

The IT management server 102 can implement an SIP library/connector module 208 to initiate a communication session between the IT administrator and an online or available user. Using the availability status of users or user group(s), the SIP library/connector module 208 initiates an instant messaging session between an online/available user and an IT administrator. Such a communication session may be utilized to exchange information about an alert notification. Alternatively, an alert may indicate a query or a problem to which a solution is sought from the online user. Such a solution may be provided using the communication session (e.g., an email, an instant messaging session, etc.).

The SIP library/connector module 208 can facilitate load balancing technique while sending multiple alert notifications to a plurality of users. For example, if in a user group (e.g., a user group dedicated for alerts related to SQL Server), two of the three users are busy attending to prior alert notifications, then the SIP connector module 208 sends a subsequent alert notification to the third user. Alternatively, the SIP connector module 208 may determine the least loaded user (i.e., user with the least or no alert notifications) and sends a subsequent alert notification to such a user. It may be noted that the above described load balancing technique(s) may be operative in both manual and automatic mode of network management.

The IT management server 102 may further include other modules 210 that facilitate display of data on the interactive interface. The IT management server 102 further includes a network interface 212 that enables communication through the network 104.

Exemplary Session Initiation Protocol (SIP) Server

Figure 3:
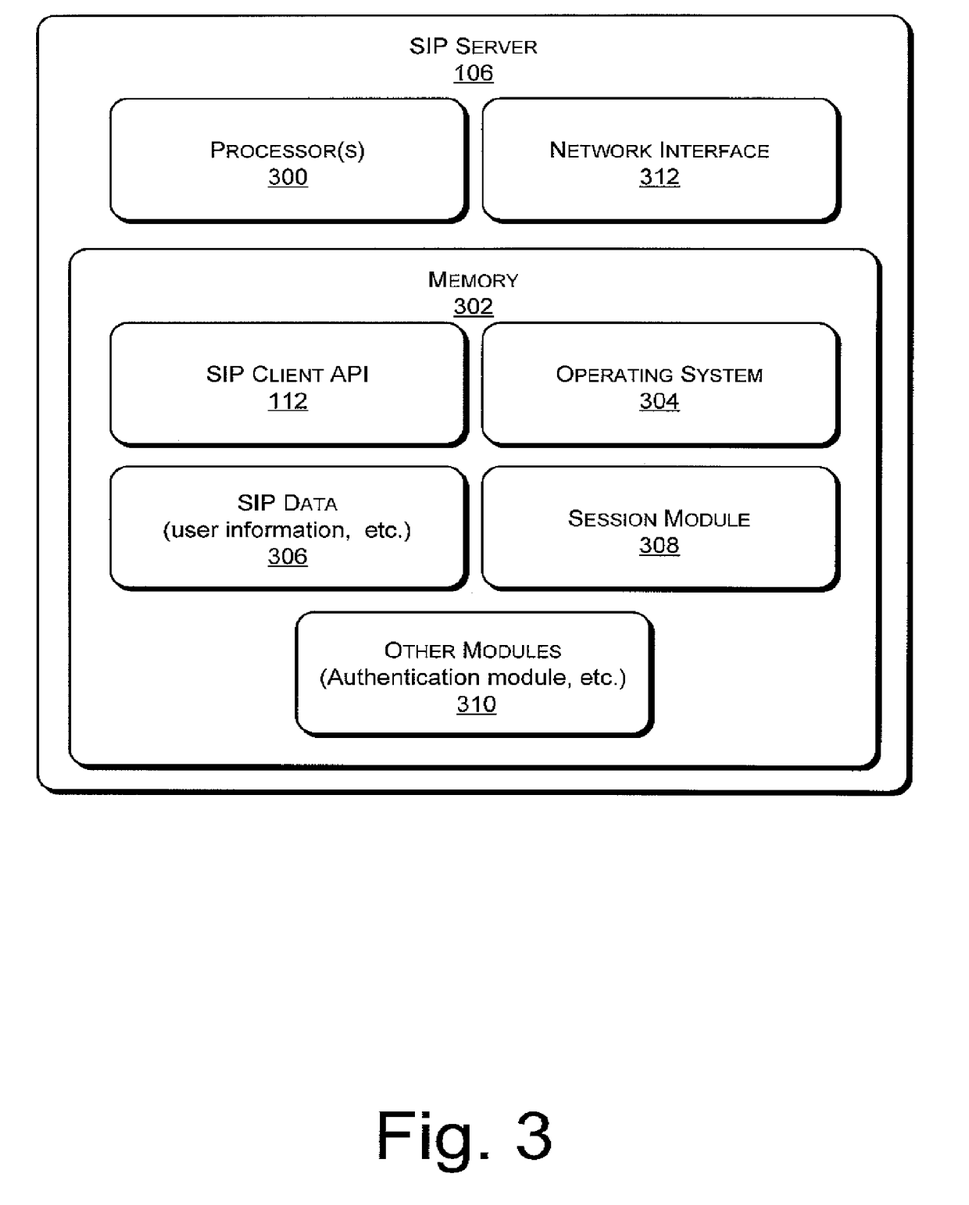
FIG. 3 is an illustration of an implementation of an exemplary session initiation protocol (SIP) server to facilitate presence aware notification for information technology management.

FIG. 3 shows an implementation of an exemplary session initiation protocol (SIP) server to facilitate presence aware notification for IT management. To this end, the SIP server 106 includes one or more processors 300 coupled to a memory 302. Processor(s) 300 could be for example, microprocessors, microcomputers, microcontrollers, digital signal processors, central processing units, state machines, logic circuitries, and/or any devices that manipulate data based on operational instructions. The processor(s) 300 are configured to fetch and execute computer-program instructions stored in the memory 302. Memory 302 includes computer-readable media in the form of volatile memory, such as Random Access Memory (RAM) and/or non-volatile memory, such as Read Only Memory (ROM) or flash RAM or a combination thereof.

The memory 302 can include an operating system 304 that provides a platform for execution of one or more applications on the IT management server 102. The memory 202 can further include the SIP client API 112 that is used to expose user information associated with one or more users or user group(s). Accordingly, the SIP client API 112 gathers relevant user information from one or more users and populates the monitoring console 108 with the gathered user information. The gathered user information is stored in SIP data 306 and may include user name, user identifier (e.g., employee ID), group information (e.g., group name), SQL server operators (e.g. SQL Server), availability status, calendar information (e.g., out of office, vacation, leave details of users), etc. In addition, the SIP client API 112 may maintain or store a record of an IP address, an email ID, a phone numbers, etc. of one or more users in the SIP data 306.

In an implementation, the monitoring console 108 invokes the SIP client API 112 to populate user information associated with one or more users (e.g. user devices 114) or user group(s) 122. The monitoring console 108 may utilize the user information to ascertain the availability status and location of a user (e.g., user devices 114) or users of a user group (e.g., user group 122). The monitoring console 108 directs an alert notification to a user or a user group based on their availability status by way of an electronic mail (email), or a short messaging service (SMS), or an instant message on the user devices 114, etc. In an alternative embodiment, the user information may be displayed on an interactive interface at the monitoring console 108. Such an interface enables an IT administrator to send an alert notification to a user or a user group (e.g., user group 122) based on their availability status and location.

Subsequently, the SIP library/connector module 208 invokes a session module 308 to establish a communication session between an IT administrator and an online or available user. The communication session may be one or more of Internet telephone calls, multimedia conferences, instant messaging sessions, chat sessions, etc. For example, the session module 308 may implement an instant messaging protocol to provide presence or availability information to the SIP client API 112 which is forwarded to the monitoring console 108. Using the availability information, the monitoring console 108 enables an IT administrator to trigger an instant communication session with an online user. Such a session may be utilized to exchange information about an alert notification.

An alert may also correspond to a problem for which a solution is sought from the online user. A solution may be provided using the communication session, for example an instant messaging session. It may be appreciated that the session module 308 may employ instant messaging systems, such as Windows® Live Messenger (WLM); Microsoft® network (MSN) messenger; iChat AV; Apple® Computer's AOL Instant Messenger (AIM); Yahoo!® Messenger; etc. Various other instant messaging systems known in the art may also be employed to gather presence information (i.e., availability status) of the user and to facilitate communication sessions as above. Presence information may also correspond to "buddy status" in most common Instant messaging systems like Skype™, Yahoo!® Messenger, etc.

The session module 308 may also provide a call option to an IT administrator. Correspondingly, the IT administrator may initiate an Internet telephone call session with an online or available user. In such an embodiment, the session module 308 may support protocols, such as, voice over internet protocol (VOIP), etc. The session module 308 may also create and end such call sessions upon the discretion of the participants.

The SIP server 106 may further include other modules 310 that facilitate authentication of users before sending the alert notifications to each of users. Such authentication may prompt a user to input a user name, a password, or other credentials, etc. associated with the user. The IT management server 102 further includes a network interface 312 that enables communication through the network 104 and sub network 116. The network 104 and sub network 116 may also be implemented as a singular network or a combination thereof.

Exemplary Interactive Interface

Figure 4:
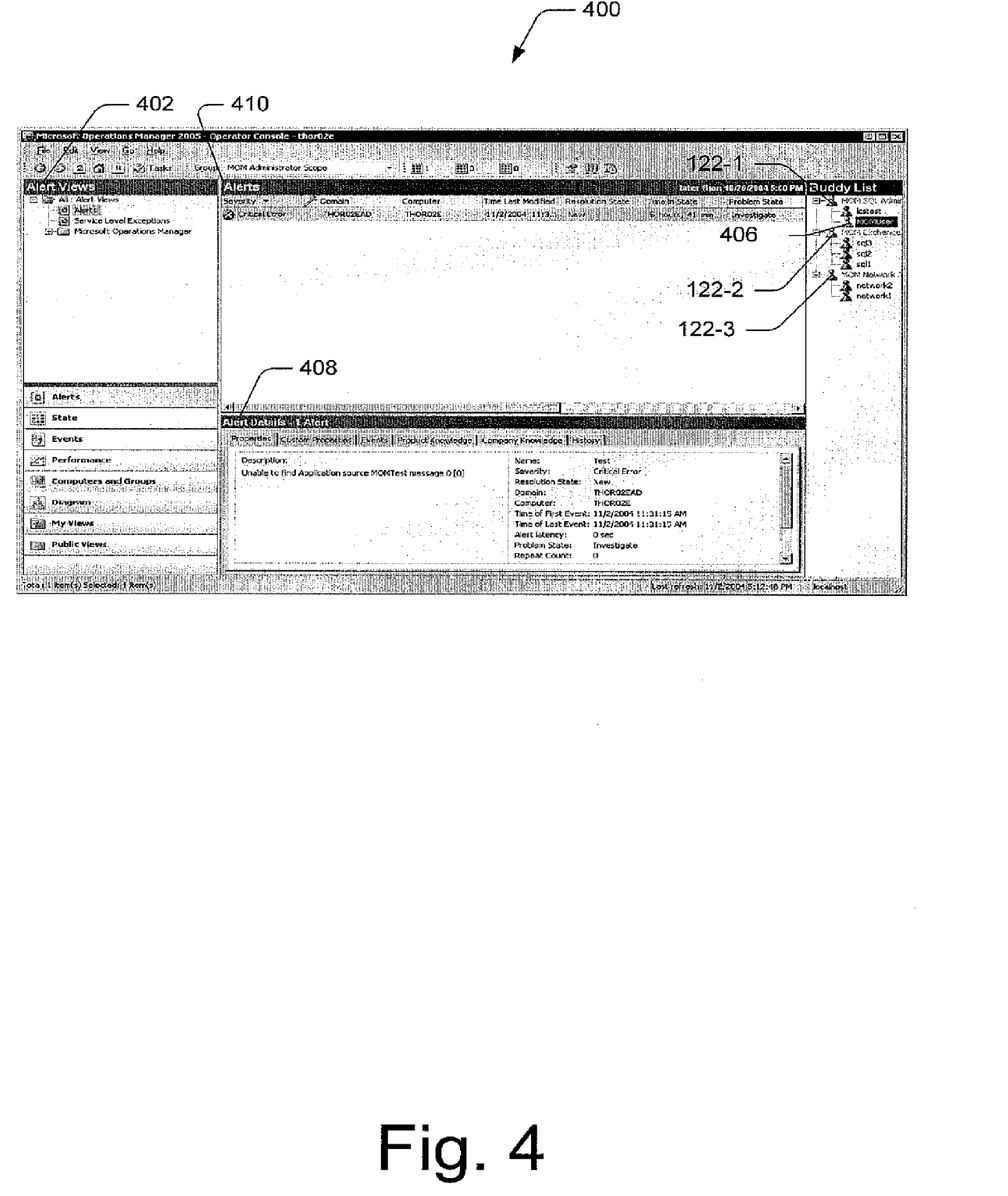
FIG. 4 is an illustration of an exemplary interactive interface for information technology management using presence aware notification.

FIG. 4 shows an exemplary interactive interface 400 for IT management using presence aware notification. The interactive interface 400 can include a section displaying a list of alerts. This section is shown as alert views 402 in the interactive interface 400. The alert views 402 displays a list of all alerts received from the monitoring database 110. The interface 400 displays a list of user groups and users, shown as buddy list 404, that are associated with a network management system (e.g. Ops Mgr). The buddy list 404 is a representation of user information as populated by the SIP client API 112.

Furthermore, the buddy list 404 may correspond to one or more user groups 122-1, 122-2, and 122-3. In an exemplary implementation, the user groups 122 are formed by the monitoring console 108 based on role based security policy. Each user group 122 can include one or more users associated with the group. For example, the user group 122-1 includes a user 406 shown as a Ops Mgr user. The user 406 may be online by utilizing a user device (erg. user device 114). In an exemplary configuration, each user is characterized by an availability status which is indicative of the user being online or offline. An online user is indicated by a green icon associating the online user and an offline user is indicated by a red icon associating the offline user. An IT administrator may infer the availability status of a user by the color of the associated icon.

The interactive interface 400 may also include alert details 408 as received by the monitoring database 110. As shown in FIG. 4, the alert details 408 include tabs for alert properties, events, product knowledge, company knowledge, and history. The alert properties can include an alert description, alert name, alert severity, resolution state of the alert, domain name, computer name, time of first and second event triggering the alert notification, problem state, etc. The alert details 408 enable a user to comprehend an alert notification and to provide a solution or assistance for the associated problem. The interactive interface 400 also includes a display area for alerts 410 for a tabular listing of one or more alerts along with their associated properties. An IT administrator may utilize the interactive interface 400 to send an alert notification.

In an exemplary implementation, the interactive interface exposes efficient notification capabilities of the monitoring console 108. To this end, an IT administrator drags and drops an alert onto an online or available user. In yet another configuration, the alert may be dropped onto a user group and the monitoring console may be configured to send an alert notification to a user in the user group (e.g., user group 122). Such alert notification capabilities ensure a higher probability of getting a solution for an alert. In an alternative implementation, an IT administrator may initiate a communication session (e.g. an instant messaging session, an internet telephone session, etc.) with one or more online users. This may be accomplished by clicking on an online user (e.g. 406) on the interface 400. It may be appreciated that an online or available status may imply that a particular user is in communication with the SIP server 106 through one of the user devices 114. Accordingly, the manner in which an alert notification is send to a user depends upon the respective user device 114. The SIP server 106 can employ various methods and systems known in the art for sending alert notifications to different types of user devices 114.

Exemplary Method

Figure 5:
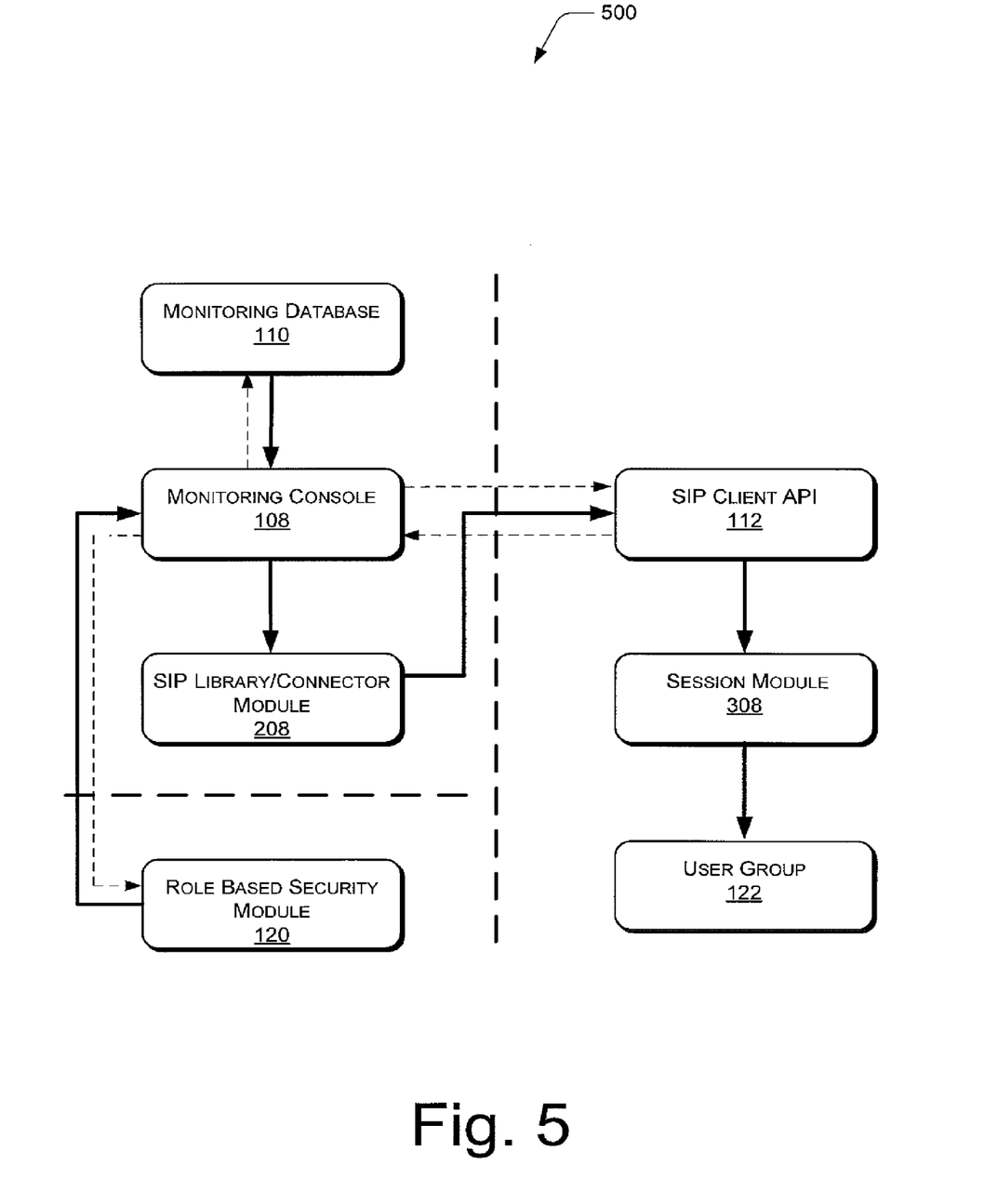
FIG. 5 is an illustration of a series of exemplary interactions between an information technology management server and session initiation protocol (SIP) server according to an embodiment.

Exemplary methods for presence aware notification for IT management are described with reference to FIGS. 1 to 4. These exemplary methods may be described in the general context of computer executable instructions with a special reference to FIG. 5. FIG. 5 illustrates a series of exemplary interactions 500 between various modules or blocks of the system 100 according to an embodiment. The bold dashed lines represent an interface or machine boundary between two computing devices. In certain implementations, the described modules or blocks may be part of the same machine or computing device Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 6:
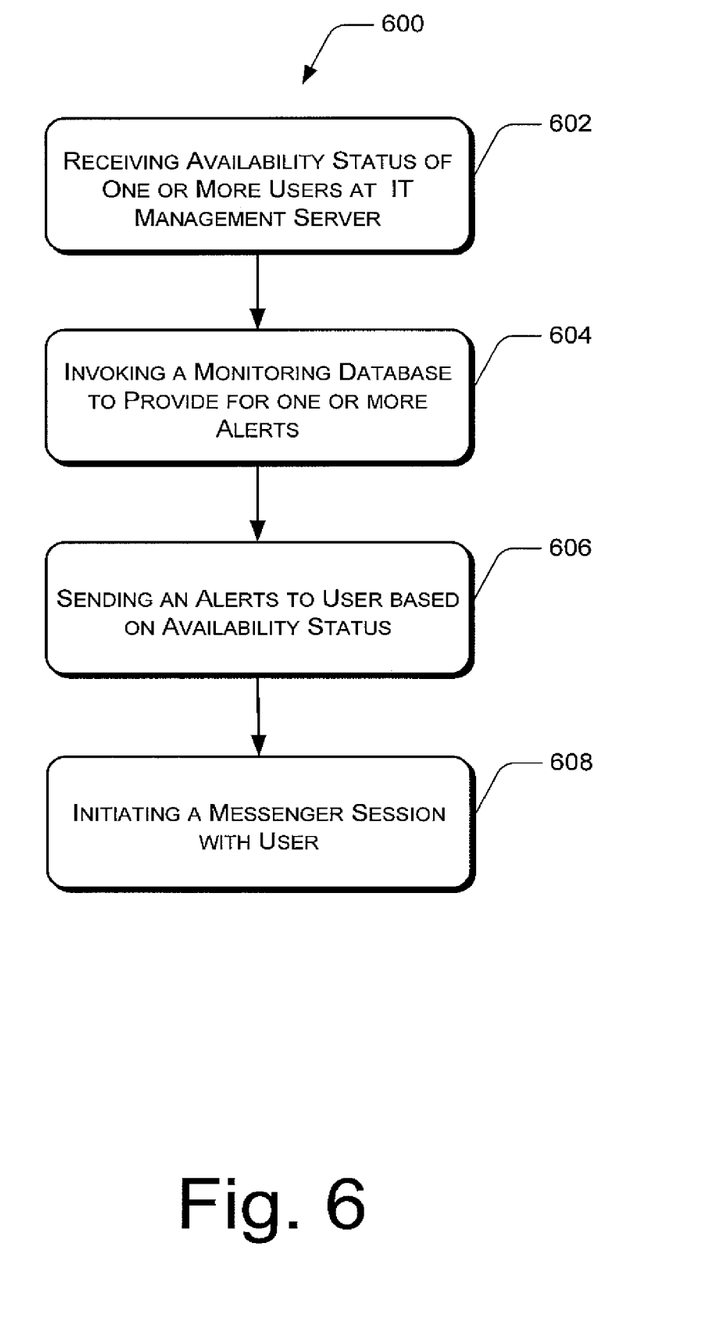
FIG. 6 is a flowchart illustrating an exemplary method for information technology management utilizing presence aware notification.

FIG. 6 illustrates an exemplary method 600 for IT management utilizing presence aware notification. The order in which the method is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method can be implemented in any suitable hardware, software, firmware, or combination thereof.

At block 602, availability status of one or more users is received at an IT management server 102. In an exemplary implementation, the monitoring console 108 invokes an SIP client API 112 to provide for availability or online status of one or more users. Upon such an invocation, the SIP client API 112 populates user information (e.g. availability status, user name, location, etc.) at the monitoring console 108. The monitoring console 108 receives such user information and stores it in the management data 206. The above mentioned interactions between the monitoring console 108 and the SIP client API 112 are shown in FIG. 5 as dashed arrows between the two blocks. In an alternative embodiment, the monitoring console 108 receives the user information corresponding to a plurality of users and forms groups based on a role based security policy. In such an embodiment, the monitoring console 108 receives a role description from the role based security module 120. The interactions between the monitoring console 108 and the role based security module 120 are illustrated in FIG. 5 by a solid arrow and a dashed arrow.

At block 604, a monitoring database is invoked to provide one or more alerts. The monitoring console 108 queries the monitoring database 110 to provide for one or more alert notifications. Such alert notifications may include alert details and the monitoring console 108, upon receipt, stores the alert notification in the management data 206. The interactions between the monitoring database 110 and the monitoring console 108 are illustrated by a solid and a dashed arrow. In another embodiment, the monitoring console 108 displays the user information (e.g., availability status and location of a user), group information (e.g., group name), alerts and alert details in an interactive interface (e.g. 400) at the IT management server 102. Such an interactive interface indicates whether a user is online or offline by means of colored icons with green color representing an online user and a red color representing an offline user respectively. The interactive interface exposes the capabilities of the monitoring console 108 for efficient alert notification.

At block 606, an alert notification is sent to a user based on an availability status of the user. Accordingly, the monitoring console 108 sends an alert notification to a user based on the availability status of the user as received at block 602. For example, alert notification is sent to an online user as indicated by its availability status. An IT administrator may utilize the interactive interface (of block 604) to send alert notifications to one or more users based on their availability status and location. The alert notification may be sent as an electronic mail (email), a text message, an instant message, an SMS (short message service), etc.

SIP library/connector module 208 as implemented in IT management server 102 may facilitate load balancing prior to sending alert notifications to one or more users. The SIP library/connector module 208 can determine a least loaded user (i.e., a user with the least or null/zero alerts) and sends subsequent alert notifications to the least loaded user. Such a load balancing technique may be implemented based on a "round robin" or a "free/busy" algorithm. The interaction between the monitoring console 108 and the SIP connector module 208 is shown in FIG. 5 by a solid arrow. The interaction between the SIP connector module 208 and the SIP client API 112 is shown in FIG. 5 by another solid arrow. The two solid arrows illustrate the path of an alert notification when sent from the monitoring console 108 to the SIP client API 112.

At block 608, a communication session is initiated with the user. In an exemplary implementation, the SIP connector module 208 establishes the communication session with the user. The communication session may be one or more of internet telephone calls, multimedia conferences, instant messaging sessions, chat sessions etc. In an exemplary implementation, the SIP server 106 implements a session module 308 to facilitate creating of one or more communication sessions between the monitoring console 108 and an online or available user. For example, the session module 308 may implement an instant messaging protocol to provide online or availability status of a user to the SIP client API 112. An IT administrator utilizes such online or availability status of a user to trigger a communication session with an online or available user. Such a communication session enables quick response and resolution time for an alert notification. The interaction between the SIP client API 112 and session module 308 is shown in FIG. 5 by a solid arrow.

CONCLUSION

The above-described methods and computer describe presence aware notification for IT management. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A server comprising:
a memory;
one or more processors operatively coupled to the memory; and
a monitoring console executable by the one or more processors and configured to query a monitoring database for alert notifications, and to select a user of a plurality of users to receive one of the alert notifications based on online presence information of the plurality of users and on a number of alerts currently being handled by individual ones of the plurality of users, wherein the user is a least-loaded user of a subset of the plurality of users who are determined, based on the online presence information, to be available to receive the one of the alert notifications.

2. The server of claim 1, wherein the alert notifications describe error conditions of applications on one or more remote client devices.

3. The server of claim 1, wherein the alert notifications originate from one or more agents installed in one or more remote client devices.

4. The server of claim 1, wherein the monitoring console is configured to receive the presence information from devices of the plurality of users.

5. The server of claim 1, further comprising a communication module executable by the one or more processors and configured to initiate a communication session between the server and a device of the selected user.

6. The server of claim 1, wherein the monitoring console is further executable and configured to select the user to receive the one of the alert notifications based on the user currently processing no alerts.

7. A method comprising:
receiving, by one or more processors, availability status of a plurality of users;
invoking, by the one or more processors, a monitoring database that provides alerts regarding error conditions of one or more computing devices; and
sending, by the one or more processors, an alert notification regarding one of the error conditions to a device associated with a user of the plurality of users, the sending of the alert based on availability of the user and a number of other alerts being handled by the user, wherein the user is a least-loaded user of a subset of the plurality of users who are determined, based on the availability status, to be available to receive the alert notification.

8. The method of claim 7, wherein the receiving includes populating user availability information.

9. The method of claim 7, wherein the invoking includes querying the monitoring database to provide the alert notification.

10. The method of claim 7, wherein the sending includes sending the alert notification to the device as one or more of an electronic mail message, a text message, an instant message, and an SMS (short message service) message.

11. The method of claim 7, further comprising initiating a communication session with the device.

12. The method of claim 11, wherein the initiating the communication session is based on the availability of the user.

13. One or more computer-readable storage devices comprising a plurality of programming instructions executable by one or more processors to:
receive availability status of a plurality of users;
receive alerts regarding an error condition of one or more computing devices of a monitored network; and
send an alert notification regarding the error condition to a device of a user of the plurality of users based on availability of individual ones of the plurality of users and based on a number of alerts currently being handled by individual ones of the plurality of users, wherein the user is a least-loaded user determined to be available, based on the availability status, to receive the one of the alert notifications.

14. The one or more computer-readable storage devices of claim 13, wherein the plurality of programming instructions are further executable by the one or more processors to send the alert notification via an instant message session initiated to the device of the user.

15. The one or more computer-readable storage devices of claim 14, wherein the alert notification is sent to the device of the user in a manner that depends on a capability of the device of the user.

* * * * *